United States Patent [19]

Dubeck et al.

[11] 4,066,733
[45] Jan. 3, 1978

[54] METAL EXTRACTION FROM SEA NODULES

[75] Inventors: Michael Dubeck, Birmingham; Gordon G. Knapp, Southfield, both of Mich.

[73] Assignee: Ethyl Corporation, Richmond, Va.

[21] Appl. No.: 728,275

[22] Filed: Sept. 30, 1976

Related U.S. Application Data

[63] Continuation-in-part of Ser. No. 562,904, March 28, 1975, abandoned, which is a continuation-in-part of Ser. No. 396,763, Sept. 13, 1973, abandoned.

[51] Int. Cl.$^2$ .................. C01G 3/14; C01G 51/12; C01G 53/12
[52] U.S. Cl. .................................. 423/32; 423/49; 423/53; 423/150; 423/DIG. 4
[58] Field of Search .................. 423/32, 33, 49, 53, 423/150, 50; 75/103, 117, 119

[56] References Cited

U.S. PATENT DOCUMENTS

| 2,621,107 | 1/1952 | Dean et al. | 423/50 |
| 2,928,732 | 3/1960 | Bare et al. | 75/103 |
| 3,471,285 | 10/1969 | Rolf | 75/103 |
| 3,734,715 | 5/1973 | Redman | 75/119 |
| 3,983,017 | 9/1976 | Szabo | 423/150 |
| 3,994,720 | 11/1976 | Dubeck | 423/150 |

FOREIGN PATENT DOCUMENTS

| 515,817 | 8/1955 | Canada | 423/50 |

OTHER PUBLICATIONS

Rakovskii et al. "Reduction of Iron Oxides by Products from Pyrolytic Decomposition of Fuels" Chemical Abstracts vol. 67 1967 No. 102057z.

Ehrlich, Editor, Copper Metallurgy, A.I.M.E. New York 1970 p. 72.

*Primary Examiner*—O. R. Vertiz
*Assistant Examiner*—Brian E. Hearn
*Attorney, Agent, or Firm*—Donald L. Johnson; Robert A. Linn; Willard G. Montgomery

[57] ABSTRACT

A process is disclosed for extracting nickel, copper, cobalt and molybdenum from a complex ore containing copper, nickel, cobalt, molybdenum, manganese and iron. The process features treatment of the ore with gaseous compound followed by leaching with an aqueous ammonia/ammonium salt solution into which is additionally introduced sulfite.

11 Claims, No Drawings

METAL EXTRACTION FROM SEA NODULES

CROSS REFERENCE TO RELATED APPLICATION

This application is a Continuation-in-Part of copending application Ser. No. 562,904, filed Mar. 28, 1975, which in turn is a Continuation-in-Part of application Ser. No. 396,763, filed Sept. 13, 1973, both now abandoned.

BACKGROUND OF THE INVENTION

The subject matter of the present invention is the recovery of metal values from a complex ore. The recovery comprises an ore pretreatment/leaching sequence.

Complex ores containing large amounts of manganese and lesser amounts of iron, nickel, copper, cobalt, molybdenum and other metals are found as loose deposits in various locations on the ocean floor. These loose deposits are commonly referred to as sea nodules, manganese nodules, ocean nodules, manganese sea nodules, etc. Methods for recovering metals from these nodules are described in U.S. Pat. Nos. 3,723,095, 3,728,105, 3,734,715, South African No. 71/04584, and in U.S. application Ser. No. 396,764, filed Sept. 13, 1973. These methods essentially involve pretreatment of the comminuted ore with gaseous reactant at elevated temperatures, followed by leaching with an aqueous ammonia/ammonium salt solution to extract copper, nickel, cobalt and molybdenum. The only ammonium salts taught to be useful are ammonium carbonate, ammonium halides, e.g., $NH_4CL_4$, and ammonium sulfates, e.g., ammonium sulfate.

We have discovered that the amount of cobalt extracted is unexpectedly and substantially increased by introducing sulfite or bisulfite ions into this aqueous leach solution.

Further, we have discovered that pretreatment of the comminuted ore with gaseous reductant prior to leaching can be effected at much lower temperatures than previously reported by the addition of sulfite or bisulfite ions to the leach solution. This represents a substantial economic advantage over known methods of recovering metals from manganese nodules.

SUMMARY OF THE INVENTION

In a process for recovering nickel, copper, cobalt and molybdenum from a complex ore containing manganese, iron, copper, nickel, cobalt and molybdenum by treating comminuted ore with gaseous reactant at elevated temperatures and subsequently leaching the treated ore with an aqueous solution containing ammonia/ammonium salt, the improvement which comprises treating said comminuted ore with gaseous reactant at a temperature lower than about 400° C., and introducing sulfite into said aqueous solution during leaching.

DESCRIPTION OF THE PREFERRED EMBODIMENTS

The present invention is embodied in an improved process for recovering copper, nickel, cobalt and molybdenum from sea nodules containing copper, nickel, cobalt, molybdenum, manganese and iron and being substantially free of sulfidic sulfur which comprises 1. treating comminuted ore with gaseous reactant selected from the group consisting of alcohols, aldehydes, reducing gases, and mixtures thereof;
2. leaching said treated ore with aqueous solution containing ammonia and ammonium salt other than a sulfite or bisulfite;
3. separating any insoluble material which remains after said leaching whereby a solution containing soluble copper, nickel, cobalt, and molybdenum substantially free of manganese and iron is obtained, the improvement which comprises treating said comminuted ore with said gaseous reactant at elevated temperatures lower than about 400° C., and providing sulfite in said leaching solution whereby cobalt solubilization is increased.

The native complex ore or sea nodules vary both in physical characteristics and chemical composition depending on the region the nodules are obtained. A detailed chemical analysis of nodules from the Pacific Ocean is given on Pages 449–450, in *The Encyclopedia of Oceanography*, R. W. Fairbridge, Reinhold Publishing Corp., N.Y. (1966) and U.S. Pat. No. 3,169,856. Generally, these nodules can contain up to about 40 percent manganese, up to about 25 percent of iron, less than about 2 percent copper, less than about 2 percent nickel, less than about 1 percent cobalt, less than about 0.1 percent molybdenum, and lesser amounts of other metals and minerals. These sea nodules generally are free of sulfidic sulfur.

The sea nodules are generally spherical in shape and range in diameter from about 1 to about 4 inches. Prior to being used in the present process, these nodules are ground to about 25 mesh or less, and preferably about 125 mesh or less.

The gaseous reactants with which the comminuted complex ore is treated, are alcohols, aldehydes, reducing gases and mixtures thereof. Preferred alcohols are monohydroxy alkanols having up to 4 carbon atoms. Methanol is a most preferred alcohol.

Preferred aldehydes are alkanals having up to 4 carbon atoms. Formaldehyde or paraformaldehyde are most preferred aldehydes. Mixtures containing the aldehydes and alcohols can also be used.

Useful reducing gases include CO, $H_2$, mixtures of CO/$H_2$, mixtures containing CO and/or $H_2$, e.g., synthesis gas, $CO_2$/CO mixtures, and the like.

The treatment with gaseous reactant is carried out at elevated temperatures, generally lower than about 400° C. For the alcohols and aldehydes, preferred treatment temperatures are 150° C.–400° C., with 150° C.–250° C. being more preferred, and 170° C.–225° C. being most preferred. The treatment of the heated ore with the aldehydes and alcohols or other reducing gases described above is exothermic — and this permits heating of the ore to a lower initial temperature. Thus, for example, if the desired treatment temperature is 225° C. the comminuted nodules need only be preheated to a temperature lower than 225° C. e.g. 200° C. —the exotherm from treatment with the organic compound or reducing gas supplying the additional heat to reach the desired treatment temperature. Treatment temperatures and procedures for these reducing gases are described in U.S. Pat. No. 3,734,715. As disclosed therein, preferred treatment temperatures are in the 300° C.–800° C. range, with the 300° C.–500° C. range being more useful for the more active gases and the 500° C.–800° C. range being more useful for the less active gases, for example, partially oxidized hydrocarbon fuel and reducing gases containing substantial amounts of $CO_2$. As mentioned supra, however, we have discovered that such high pretreatment temperatures are unnecessary to effect increased cobalt extraction when sulfite or bisulfite ions are added to the leach solution. By contrast, preferred treatment temperatures for the present process are in the 200° C. to 400° C. range, with a range of about 200° C. to 300° C. being more preferred and a range of about 225° C. to 275° C. being most preferred.

Any conventional method of preheating of the comminuted complex ore to treatment temperature can be used. A gaseous sweep may be used while preheating. This gaseous sweep can be any suitable gaseous material which does not adversely affect the comminuted complex ore, its treatment with alcohol, aldehyde, or reducing gas or its subsequent leachability with $NH_3$/ammonium salt containing solution. A gaseous stream of alcohol, aldehyde or reducing gas may be used during this preheating —an inert gas sweep can also be used. By inert, we mean a gas that has no adverse effect on the comminuted complex ore during the preheating. Examples of useful inert gases are $N_2$, Ar, $CO_2$ air and the like. During the preheating, a substantial amount of any water present in the comminuted ore is driven out. The amount of gaseous reactant used for the treatment at treatment temperature can be varied. Generally, sufficient gaseous reactant is used to provide a molar ratio of Mn (contained in the ore): gaseous reactant of up to 1:1. Mn:gaseous compound ratios of 1:0.5 to 1:0.75 are preferred. The treatment time will vary being dependent on the other factors such as particle size, the complex ore, the gaseous reactant used, the flow rate of the gaseous reactant, the temperature, etc.

The gaseous reactant treated ore is conventionally leached using an aqueous solution containing ammonia and an ammonium salt —useful ammonium salts are ammonium sulfate, ammonium halide, e.g., chloride, bromide or iodide, ammonium carbonate. The concentration of ammonia in the solution can vary from 5 to 25% by weight —the ammonium salt concentration can vary from 2 to 20% by weight.

of cobalt which is extracted. This sulfite may be introduced as a water-soluble salt, preferably, ammonium bisulfite or ammonium sulfite. The sulfite may also be provided by introducing $SO_2$ gas into the ammonia/ammonium salt solution —and such leaching is more efficiently conducted under pressure.

The amount of sulfite provided in the leaching solution can be varied. Generally sufficient sulfite is provided to obtain a Mn:sulfite (i.e. $SO_3^{--}$ or $HSO_3^-$) molar ratio of from 1:0.5 to 1:1.

The following general procedure was used to carry out a series of examples illustrating the process of the present invention.

GENERAL PROCEDURE

Ten grams of sea nodules, containing no sulfidic sulfur which can be measured by ordinary analytical procedures, ground to less than 150 mesh, are charged to a treatment tube arranged vertically and fitted with a heating mantle in a gas inlet at the tube's lower end and a gas outlet at the upper end. The sea nodule charge is heated to the treatment temperature under a gas sweep. This gas sweep can be a normally gaseous reactant, e.g., CO, $H_2$ or it can be an inert gas, e.g., $N_2$. The sea nodule charge is maintained at this treatment temperature for a period of about one hour while the gaseous reactant is continuously passing through the heated sea nodules. At the end of this treatment period, the heating is discontinued and the treated charge is allowed to cool at 25° C. under gas sweep.

The cooled treated charge is then directly transferred to a pressure vessel which contains 100 ml of the leaching solution containing (1) 100 g/l $NH_3$ and 100 g/l of $(NH_4)_2CO_3$ or (2) 100 g/l $NH_3$, 100 g/l $(NH_4)_2CO_3$ and 0.5 mole $NH_4HSO_3$ per mole Mn in the ore charge. The vessel is then sealed, heated to 50° C. or 100° C. and stirred for one hour. The vessel is then cooled, the leached mixture is filtered and the filtrate is analyzed by atomic absorption for soluble metal content.

Following is a tabulation of data for the aforesaid series of examples.

TABLE 1

| | METALS RECOVERY FROM SEA NODULES(1) | | | | | | | | |
|---|---|---|---|---|---|---|---|---|---|
| | Treatment Step | | | Leaching | | Percent Metals Extracted | | | |
| | Gaseous | | Temper- | Time | Solu- | Temp. | | | | |
| Ex. | Reactant | Amount(2) | ature(° C) | (Hrs) | tion | A(4) | Ni | Cu | Co | Mn |
| 1 | None | — | 240 | 1.0(3) | A(4) | 50 | 0.3 | 3 | — | — |
| 2 | None | — | — | — | B(5) | 100 | 48 | 58 | 6 | — |
| 3 | $CH_3OH$ | 1.0 | 200 | 1.0 | A | 100 | 33 | 46 | 6 | 0.04 |
| 4 | $CH_3OH$ | 0.7 | 200 | 1.0 | B | 100 | 86 | 73 | 91 | Tr(6) |
| 5 | $CO/H_2$(7) | — | 230 | 1.0 | B | 100 | 74 | 66 | 71 | — |

(1) Sea nodules analysis: Ni = 0.889%; Cu = 0.708%; Co = 0.196%; Fe = 5.73%; Mn = 20.67%.
(2) Moles of gaseous reactant per mole of Mn in the ore charge.
(3) Under $N_2$ sweep.
(4) 100 g $NH_3$/liter + 100 g $(NH_4)_2CO_3$/liter.
(5) 100 g $NH_3$/l + 100 g $(NH_4)_2CO_3$/l + 0.5 mole $NH_4HSO_3$ per mole Mn.
(6) Trace = 0.0004.
(7) 1:1 mole ratio $CO/H_2$ - determined by gas chromatograpy.

The leaching step is generally carried out at temperatures from room temperature up to about 150° C. A preferred leaching temperature for alkanol or aldehyde pretreated are over 100° C. Ordinarily, this leaching is carried out in a closed vessel to prevent loss of ammonia and $CO_2$ when the ammonium salt is ammonium carbonate.

We have found that by the addition of sulfite into the conventional ammonia/ammonium salt leach solution, the leaching efficiency is significantly improved effecting a substantial and unexpected increase in the amount From the data in Table 1, it is clear that after treatment of the comminuted sea nodules with a gaseous reactant ($CH_3OH$) leaching with $NH_3/NH_4CO_3$ solution extracts a substantial amount of the nickel and copper, but almost none of the cobalt. Examples 4 and 5 show that addition of sulfite as $NH_4HSO_3$ to the ammoniacal leach unexpectedly and substantially increases the amount of cobalt extracted. The control, Example 1, shows that $NH_3/(NH_4)_2CO_3$ leaching, after treatment of the ground nodules with only $N_2$ at 240° C. for one hour, is ineffective for extracting metals. Example 2 shows that leaching untreated ore with $NH_3/(NH_4)_2CO_3/NH_4HSO_3$ solubilizes a good amount of Ni and Cu, but only a small amount of cobalt. Comparison of Examples 3 (6 percent cobalt extracted) with 4 (91 percent cobalt extracted) and 5 (71 percent cobalt extracted) shows the substantial improvement in Co solubilization achieved by using $NH_4HSO_3$ in addition to $NH_3/(NH_4)_2CO_3$ in the leach step. Molybdenum is also found in the leach solution along with the nickel, copper and cobalt extracted.

We claim:

1. In a process for recovering cobalt, nickel, copper and molybdenum from sea nodules containing copper, nickel, cobalt, molybdenum, manganese and iron and being substantially free of sulfidic sulfur which comprises
    1. treating comminuted ore with gaseous reactant selected from the group consisting of alcohols, aldehydes and mixtures thereof;
    2. leaching said treated ore with aqueous solution containing ammonia and ammonium salt other than a sulfite or bisulfite;
    3. separating any insoluble material which remains after said leaching whereby a solution containing soluble copper, nickel, cobalt, and molybdenum substantially free of manganese and iron is obtained, the improvement which comprises treating said comminuted ore with said gaseous reactant at elevated temperatures lower than about 400° C., and providing sulfite in said leaching solution whereby cobalt solubilization is increased.

2. The process of claim 1 wherein said sulfite is provided as $SO_2$.

3. The process of claim 1 wherein said sulfite is provided as an ammonium salt selected from ammonium sulfite, ammonium bisulfite and mixtures thereof.

4. The process of claim 1 wherein sufficient sulfite is provided to obtain a Mn:sulfite molar ratio of about 1:0.5 to about 1:1.

5. The process of claim 3 wherein sufficient sulfite is provided to obtain a Mn:sulfite molar ratio of about 1:0.5 to about 1:1.

6. The process of claim 5 wherein said temperature is in the 150° C.–400° C. range.

7. The process of claim 6 wherein said temperature is in the 150° C.–250° C. range.

8. The process of claim 7 wherein said temperature is in the 170° C.–225° C. range.

9. The process of claim 6 wherein said gaseous reactant is $C_1$–$C_4$ alkanol.

10. The process of claim 5 wherein said sulfite is ammonium bisulfite.

11. The process of claim 9 wherein said alkanol is methanol.

* * * * *